United States Patent
Felton (10) Patent No.: US 7,571,333 B1
(45) Date of Patent: Aug. 4, 2009

(54) METHOD AND SYSTEM FOR AUTOMATICALLY SETTING THE OPERATING VOLTAGE AND SPEED OF DIPLEX COMMUNICATION IN A DATA STORAGE SYSTEM

(75) Inventor: Mickey S. Felton, Sterling, MA (US)

(73) Assignee: EMC Corporation, Hopkinton, MA (US)

( * ) Notice: Subject to any disclaimer, the term of this patent is extended or adjusted under 35 U.S.C. 154(b) by 282 days.

(21) Appl. No.: 11/239,801

(22) Filed: Sep. 30, 2005

(51) Int. Cl.
*G06F 1/26* (2006.01)
(52) U.S. Cl. .................. 713/310; 713/300; 713/330
(58) Field of Classification Search .......... 713/300–340
See application file for complete search history.

(56) References Cited

U.S. PATENT DOCUMENTS

| | | | |
|---|---|---|---|
| 6,157,247 A * | 12/2000 | Abdesselem et al. | 327/540 |
| 6,301,133 B1 * | 10/2001 | Cuadra et al. | 363/65 |
| 7,131,013 B2 * | 10/2006 | Sasakura et al. | 713/300 |
| 2004/0027751 A1 * | 2/2004 | Goerke et al. | 361/90 |
| 2005/0062507 A1 * | 3/2005 | Naffziger et al. | 327/105 |
| 2005/0081068 A1 * | 4/2005 | Sakakibara et al. | 713/300 |

* cited by examiner

*Primary Examiner*—Dennis M Butler
(74) *Attorney, Agent, or Firm*—Krishnendu Gupta; Scott A. Ouellette (57) ABSTRACT

A method and system for detecting the operating voltage of a disk array chassis or disk array enclosure ("DAE") attached to a fibre channel loop and adjusting the operating voltage of the entire loop based on the operating voltage detected for each disk array chassis attached to the loop is disclosed. In one embodiment, an input voltage to a DAE is detected and a control signal corresponding to the input voltage is generated. The control signal is input to a voltage selection device that inputs an operating voltage corresponding to the control signal to the operating voltage supply of the DAE.

3 Claims, 10 Drawing Sheets

METHOD AND SYSTEM FOR AUTOMATICALLY SETTING THE OPERATING VOLTAGE AND SPEED OF DIPLEX COMMUNICATION IN A DATA STORAGE SYSTEM

FIELD OF THE INVENTION

This invention relates generally to the field of data storage and more particularly to a method and apparatus for automatically setting the operating voltage and speed of diplex communication in a data storage system.

BACKGROUND OF THE INVENTION

Subsystems comprising disk arrays, i.e., groups of small, independent disk drive modules used to store large quantities of data have been developed and found to possess many advantages over a single large disk drive. For example, the individual modules of a disk array typically take up very little space and typically use less power and cost less than a single large disk drive, yet, when grouped together in an array, provide the same data storage capacity as a single large disk drive. In addition, the small disks of an array retrieve data more quickly than does a single large disk drive because, with a small disk drive, there is less distance for the actuator to travel and less data per individual disk to search through. The greatest advantage to small disk drives, however, is the boost they give to I/O performance when configured as a disk array subsystem. A disk array is typically housed in a chassis, which may be an enclosure, for holding a plurality of disk drives. When additional memory storage space is required, additional disk array chassis may be added to the existing system.

SUMMARY OF THE INVENTION

In accordance with an embodiment of the present invention, a dynamically upgradeable disk array chassis includes a chassis that contains the disk drives. The chassis may include an enclosure. The disk drives are connected in a loop with a first serial bus for transmitting data from a controller and a second serial bus for passing data back to the controller. The disk drives are connected to one or the other of the serial busses. A shunt is connected to the first and second buses at the end opposite the controller and has a normal state in which the first bus is connected to the second bus thus completing the loop. The shunt may also assume a state in which each of the first and second serial busses are connected to separate outputs. The separate outputs are used to connect to a new disk array chassis with similar busses and shunting device. Each chassis has an environmental monitor that controls the state of its shunt. A separate serial communication bus connects to the monitor. When a new disk array chassis is connected to the existing chassis, the existing chassis's environmental monitor may communicate through its serial communication bus with the serial communication bus and environmental monitor on the new disk array chassis to determine whether conditions are suitable for extending the disk drive loop to include the disks on the new disk array chassis. If no faults are detected, the existing chassis's environmental monitor switches its shunt to connect the disk drive serial busses of the existing disk array chassis to those of the new disk array chassis. The new chassis's environmental monitor leaves its shunt in the normal state to connect the two disk drive busses and the disk drive loop is again complete.

In accordance with an embodiment of the invention, diplexing is used to provide the path for the serial communication bus to the environmental monitor and the signals for the disk drive loop over the same wires of a single cable connecting the disk array chassis to one another. Preferably, low frequency signals are used for the communication with the environmental monitor and high frequency signals are used for disk drive loop communications including I/O operations. The low frequency signals may be similar to those of the RS-232 serial data protocol and the high frequency signals may adopt the Fibre Channel Arbitrated Loop signal protocol. The Fibre Channel 8B/10B signal encoding advantageously guarantees frequent transitions on the Fibre Channel signal so that the signal can always be distinguished from the low frequency signals. The Fibre Channel encoding keeps the frequency content of the Fibre Channel signal isolated to 100 MHZ and above by guaranteeing a transition at least every 5 bits. A preferred method of diplexing the low frequency serial signals and the high frequency I/O signals is described in U.S. Pat. No. 5,901,151 ("the '151 patent"), commonly owned by the assignee of the present invention, which patent is hereby incorporated by reference in its entirety.

Given that disk array chassis are being designed to operate at lower voltages and higher speeds than previous disk array chassis designs, if disk array chassis requiring different operating voltages are configured into a loop, it is important for the disk array subsystem including multiple disk array chassis to identify the speeds at which each disk array chassis is capable of operating and to operate at the lowest voltage possible. For example, older disk array chassis were designed to operate at 5V, while current disk array chassis are capable of operating on as little as 1V. This large reduction in voltage swing can present problems when interfacing legacy disk array chassis and current disk array chassis. The speed of the fibre channel has also increased from 1 Gb/s to 2 Gb/s and 4 Gb/s, and will increase further in the future. The increase in speed of the fibre channel results from the decrease in the operating voltage of the disk array chassis.

The present invention includes a method and system for detecting the operating voltage of a disk array chassis or disk array enclosure ("DAE") attached to a fibre channel loop and adjusting the operating voltage of the entire loop based on the operating voltage detected for each disk array chassis attached to the loop. In one embodiment of the invention, the environmental monitor of a disk array chassis transmits a signal to the host indicating the operating voltage of its diplexer and the host returns a voltage select signal to the DAE which instructs a multiplexer to select a particular voltage at which the diplexer of the disk array chassis is to operate. In another embodiment, an operator of the data storage system manually selects an operating speed at the host, and the host sends the voltage select signal to the DAE, sets the voltage selected by the operator. In yet another embodiment, the host sends the low frequency signal to the first disk array chassis at a selected voltage. A monitoring circuit within the diplexer detects the voltage level and sets the operating voltage of the diplexer based on the detected voltage.

BRIEF DESCRIPTION OF THE DRAWINGS

These and other features of the invention will become more readily apparent from the following detailed description when read together with the accompanying drawings, in which.

DETAILED DESCRIPTION

Figure 1:
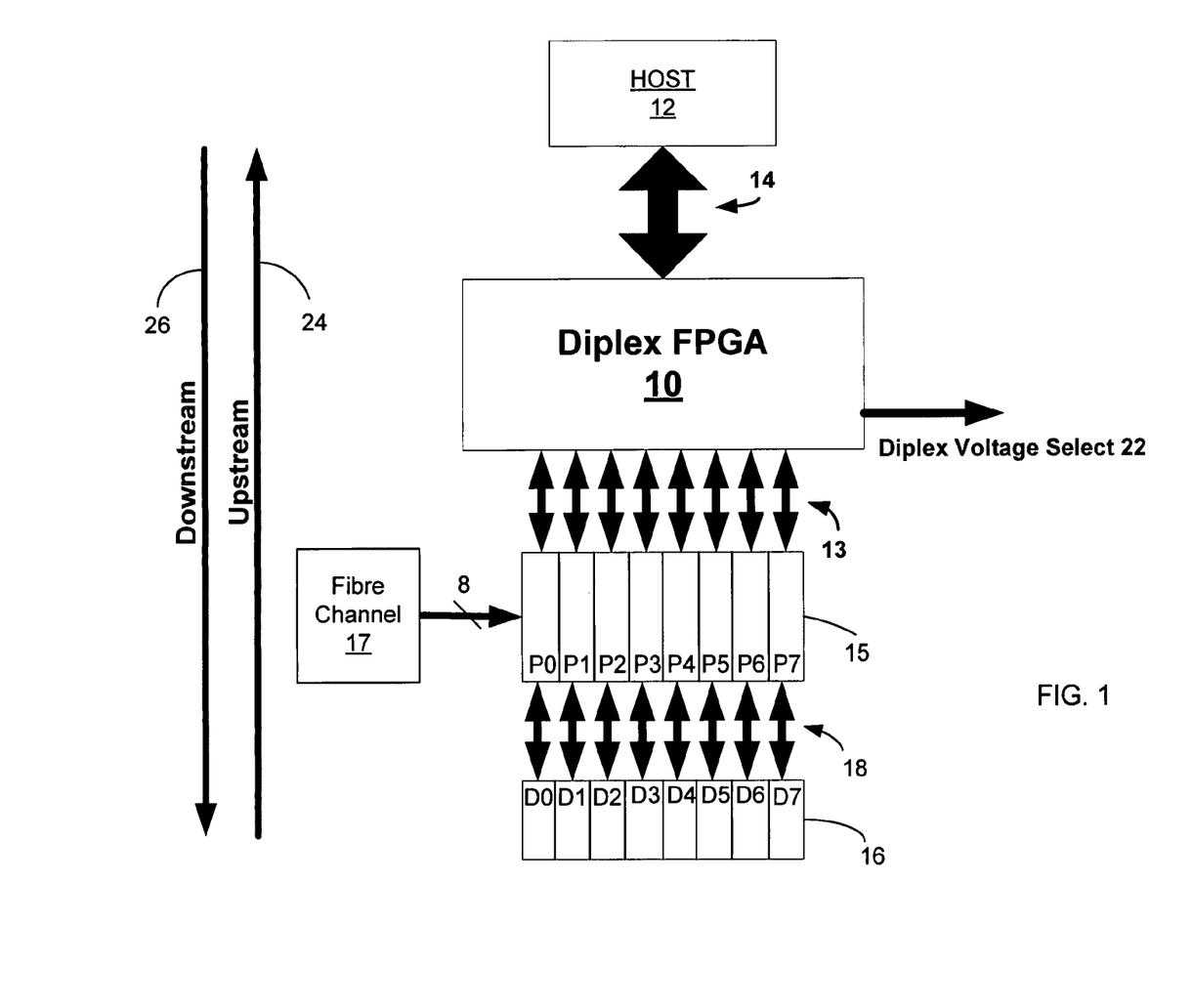
FIG. 1 is a schematic block diagram of the interfaces associated with a diplex FPGA associated with the present invention.

FIG. 1 is a schematic block diagram showing data storage system including a diplex FPGA 10 which couples a host 12 to a disk array chassis 16 including a number of disk arrays D0-D7. As shown in FIG. 1 and described in detail below, diplex FPGA 10 communicates with the host 12 over host interface 14 and with a disk array chassis 16 over diplex interface 13 through diplex logic 15. Diplex logic 15 receives low frequency diplex signals from the diplex FPGA 10 and injects the diplex signals onto a cable, such as a twinax cable 18, with fibre channel signals received from fibre channel controller 17, as described in the '151 patent.

More specifically, each diplexer in diplex logic 15 includes a port P for outputting the diplexed combination of a low frequency diplex signal from the FPGA 10 and a high frequency fibre channel signal from the fibre channel controller 17. The diplexed signal is output to an associated disk array D. For example, diplexer port P0 outputs, to disk array D0, the diplexed signal comprised of the low frequency diplex signal output from diplex UART of diplex FPGA 10 (not shown) and a high frequency fibre channel signal associated with the disk array D0. Each of ports P1-P7 output a combination of a low frequency diplex signal and a high frequency fibre channel signal to the disk array D1-D7 with which it is associated.

Diplex FPGA 10 also outputs a diplex voltage select signal over a diplex voltage select interface 22.

Figure 2:
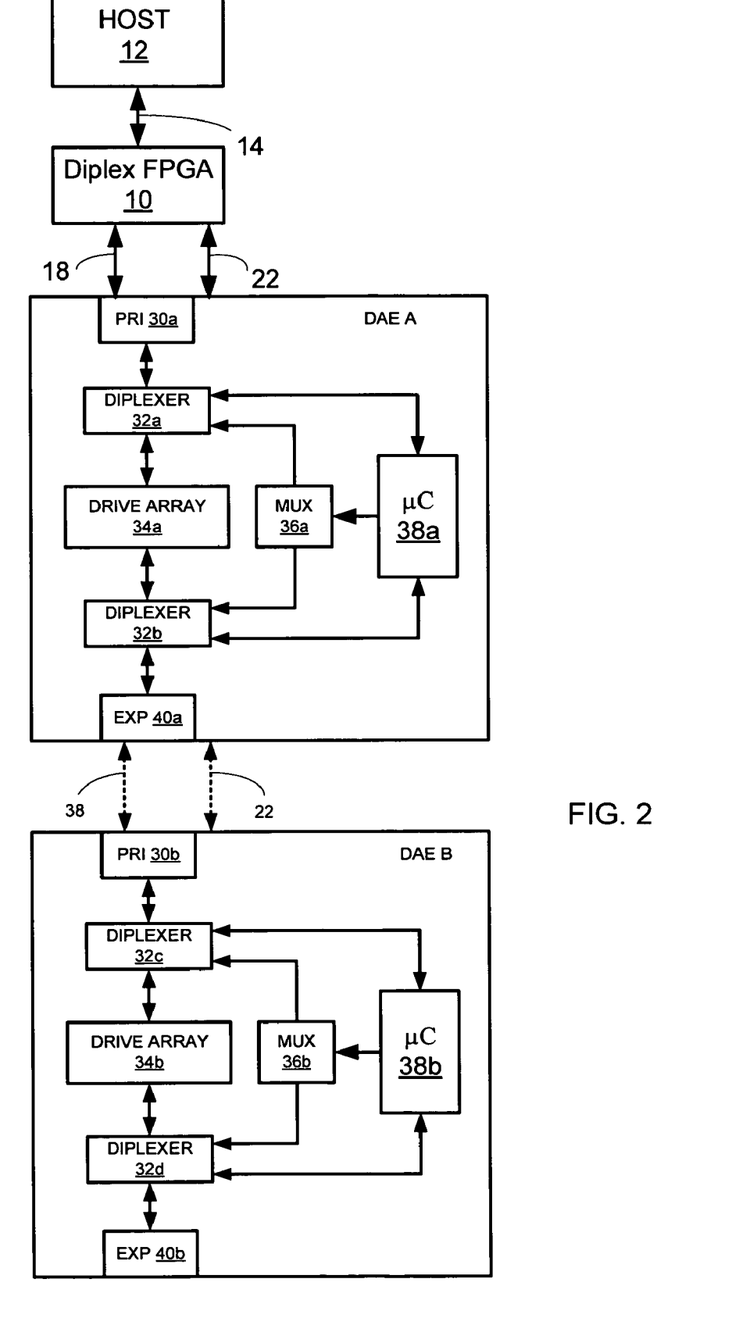
FIG. 2 is a schematic block diagram of the diplex speed autonegotiation system of the present invention.

FIG. 2 is a schematic block diagram of a diplex communication system including host 12, diplex FPGA 10 and disk array enclosures DAE A and DAE B. As shown, DAE A receives a diplex signal from the diplex FPGA over twinax line 18 and, DAE B, when connected as shown, receives a diplex signal from DAE A over twinax line 38, which is shown in phantom to indicate that DAE B need not be coupled to DAE A for the purposes of the invention described herein, although, when it is coupled to DAE A, as described below, further features of the invention may be demonstrated.

As shown in FIG. 2, DAE A includes a primary port PRI 30a which receives and transmits the diplex signal over twinax 18 and which receives and transmits control signals between the DAE and the host 12, as described below. Primary port PRI 30a passes the diplex signal to and from upstream diplexer 32a, which couples the FC portion of the diplex signal to drive array 34a and the RS-232 portion of the diplex signal to the microcontroller 38a. The FC and RS-232 diplexing operation performed by diplexer is described in the '151 patent and will not be further described herein.

Figure 3:
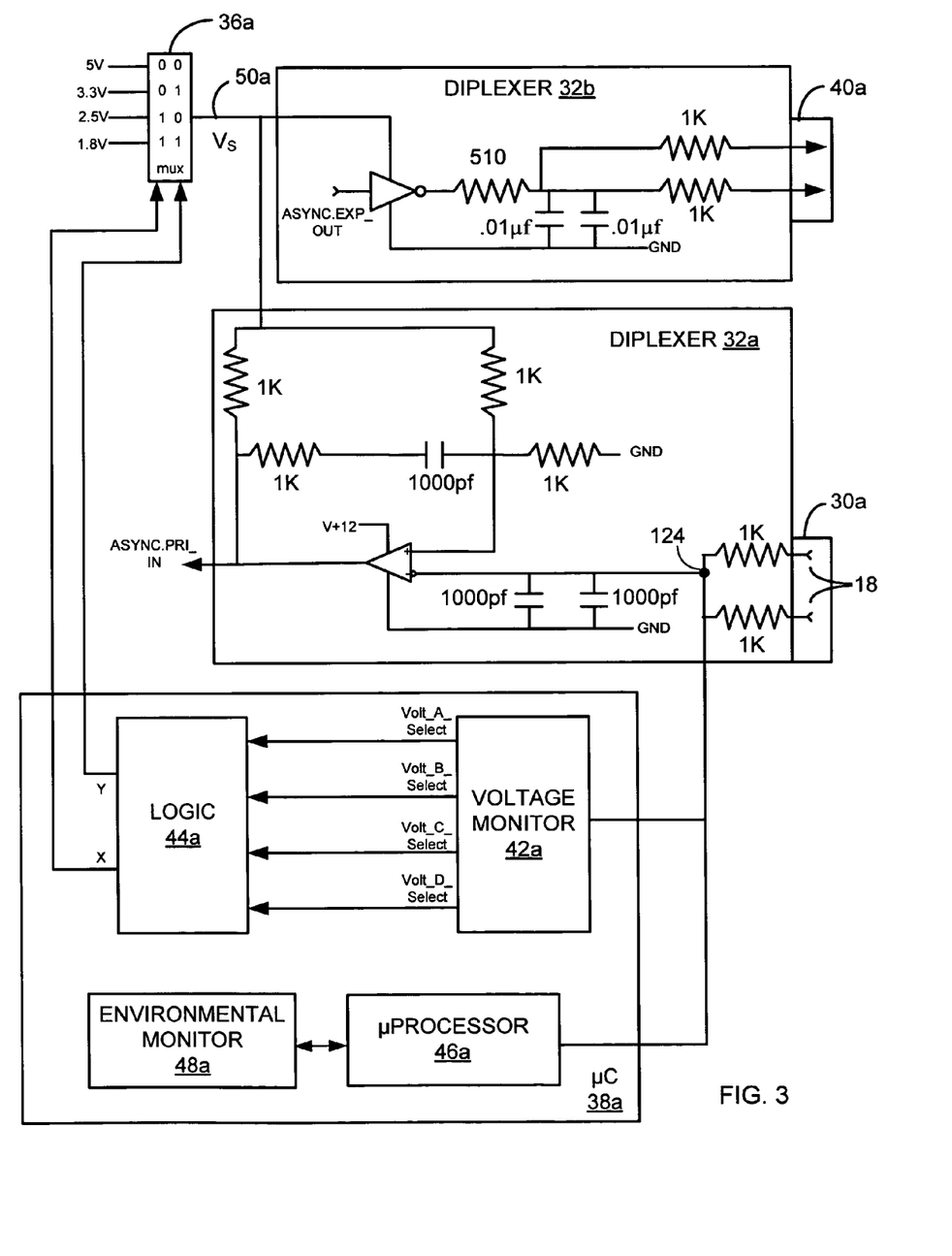
FIG. 3 is a schematic block diagram of a one embodiment of a diplexer of the present invention.

FIG. 3 is a schematic diagram of the DAE A, omitting the drive array 34a for simplicity. As shown in FIG. 3, the diplex signal is received on port 30a from twinax line 18. The RS-232 portion of the signal, at node 124, is input to voltage monitor 42a of microcontroller 38a. As is described below with reference to FIG. 4, voltage monitor 42a performs an analog to digital conversion of the input signal and outputs a number of voltage select signals. In one embodiment of the invention, voltage monitor 42a outputs four voltage select signals, Voltage_A_Select, Voltage_B_Select, Voltage_C_Select and Voltage_D_Select, which enables the microcontroller to select between four different operating voltages $V_S$ for the diplexers. It will be understood however, that two, three, or more than four select signals may be generated for selection between a number of operating voltages, depending on the operating capabilities of the DAE.

The voltage select signals are input to logic portion 44a which processes the voltage select signals and outputs control signals X and Y to multiplexer 36a. Multiplexer 36a accepts as inputs different supply voltages, one of which being coupled to the diplexers as the operating voltage, depending on the state of control signals X and Y. Once the selected supply voltage $V_S$ is coupled to the diplexers via line 50a, the diplexers will operate at the selected supply voltage.

When the diplexers operating at a particular supply voltage, the speed at which the diplex and FC signals are propagated through the DAE correspond to the particular supply voltage. In one embodiment of the invention, when the supply voltage is set to 5V, the diplex signal speed is approximately 9600 baud and the FC speed is approximately 1 GHz. Decreases in the operating voltage result in corresponding increases in the speed of the diplex and FC signals. For example, at an operating voltage of 3.3V, the diplex signal speed is approximately 19,200 baud and the FC speed is approximately 2 GHz; at an operating voltage of 2.5V, the diplex signal speed is approximately 38,400 baud and the FC speed is approximately 4 GHz; and at an operating voltage of 1.8V, the diplex signal speed is approximately 76,800 baud and the FC speed is approximately 8 GHz.

Figure 4:
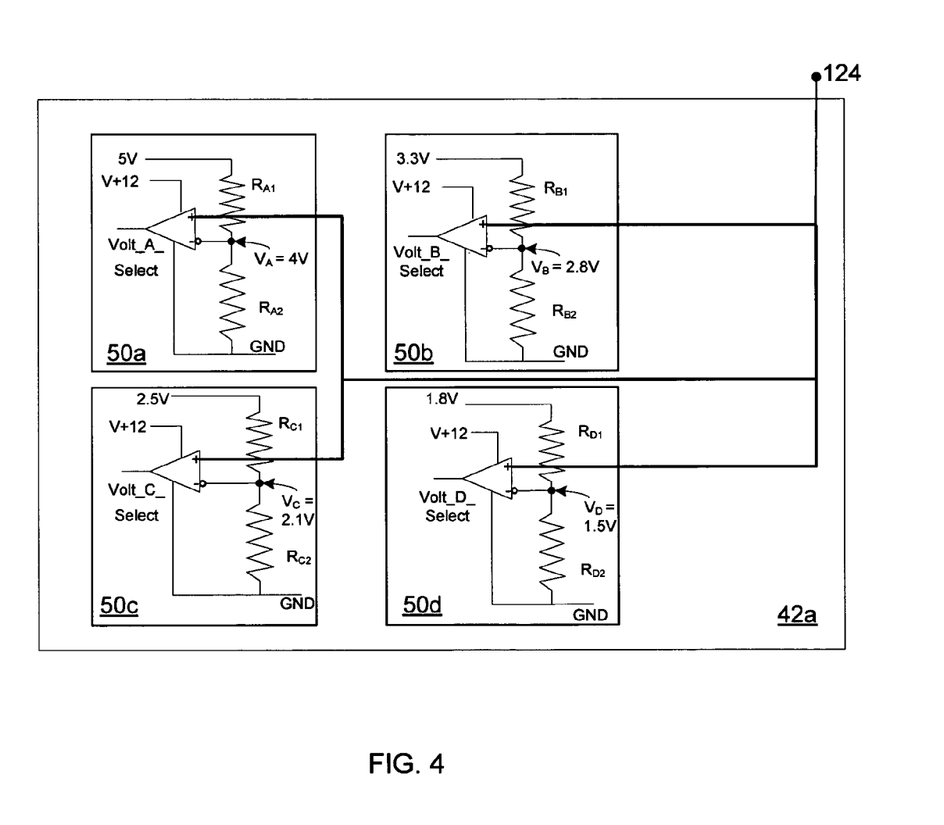
FIG. 4 is a schematic block diagram of the voltage monitor of the diplexer of FIG. 3 in accordance with the present invention.

FIG. 4 is a schematic diagram of the voltage monitor 42a. Voltage monitor 42a includes four analog to digital converters 50a, 50b, 50c and 50d. The diplex signal at node 124 is input to each of the converters 50a-50d. Converters 50a-50d are structurally identical, with the exception of the values of the voltage-dividing resistors $R_{A1}$, $R_{A2}$, $R_{B1}$, $R_{B2}$, $R_{C1}$, $R_{C2}$, $R_{D1}$ and $R_{D2}$ and the supply voltage that is divided in the voltage divider of each converter.

Converter 50a comprises a supply voltage of 5V and voltage-dividing resistors $R_{A1}$ and $R_{A2}$ that operate to create a threshold voltage $V_A$ of 4V. The diplex signal voltage at node 124 is compared to the threshold voltage $V_A$ by the comparator of converter 50a and the comparator outputs the Volt_A_Select signal based on the comparison. Converter 50b comprises a supply voltage of 3.3V and voltage-dividing resistors $R_{B1}$ and $R_{B2}$ that operate to create a threshold voltage $V_B$ of 2.8V. The diplex signal voltage at node 124 is compared to the threshold voltage $V_B$ by the comparator of converter 50b and the comparator outputs the Volt_B_Select signal based on the comparison. Converter 50c comprises a supply voltage of 2.5V and voltage-dividing resistors $R_{C1}$ and $R_{C2}$ that operate to create a threshold voltage $V_C$ of 2.1V. The diplex signal voltage at node 124 is compared to the threshold voltage $V_C$ by the comparator of converter 50c and the comparator outputs the Volt_c_Select signal based on the comparison. Lastly, converter 50d comprises a supply voltage of 1.8V and voltage-dividing resistors $R_{D1}$ and $R_{D2}$ that operate to create a threshold voltage $V_D$ of 1.5V. The diplex signal voltage at node 124 is compared to the threshold voltage $V_D$ by the comparator of converter 50*d* and the comparator outputs the Volt_D_Select signal based on the comparison.

In operation, if the voltage at node 124 is greater than 4V, indicating that the system is operating at an operating voltage of approximately 5V, the Volt_A_Select signal output from converter 50*a* will be high. Likewise, in this case, since the voltage at node 124 will be higher than the threshold voltages $V_B$, $V_C$ and $V_D$, the Volt_B_Select, Volt_C_Select and Volt_D_Select signals output from converters 50*b*, 50*c* and 50*d*, respectively, will also be high. Accordingly, when the DAE is operating at 5V, the output of voltage monitor 42*a* is "1111", corresponding to voltage select signals A, B, C, D.

If the voltage at node 124 is less than 4V but greater than 2.8V, indicating that the system is operating at an operating voltage of approximately 3.3V, the Volt_A_Select signal output from converter 50*a* will be low. In this case, since the voltage at node 124 will be higher than the threshold voltages $V_B$, $V_C$ and $V_D$, the Volt_B_Select, Volt_C_Select and Volt_D_Select signals output from converters 50*b*, 50*c* and 50*d*, respectively, will be high. Accordingly, when the DAE is operating at 3.3V, the output of voltage monitor 42*a* is "0111", corresponding to voltage select signals A, B, C, D.

If the voltage at node 124 is less than 2.8V but greater than 2.1V, indicating that the system is operating at an operating voltage of approximately 2.5V, the Volt_A_Select signal output from converter 50*a* and the Volt_B_Select signal output from converter 50*b* will be low. In this case, since the voltage at node 124 will be higher than the threshold voltages $V_C$ and $V_D$, the Volt_C_Select and Volt_D_Select signals output from converters 50*c* and 50*d*, respectively, will be high. Accordingly, when the DAE is operating at 2.5V, the output of voltage monitor 42*a* is "0011", corresponding to voltage select signals A, B, C, D.

Finally, if the voltage at node 124 is less than 2.1V but greater than 1.5V, indicating that the system is operating at an operating voltage of approximately 1.8V, the Volt_A_Select signal output from converter 50*a*, the Volt_B_Select signal output from converter 50*b* and the Volt_C_Select signal output from converter 50*c* will be low. In this case, since the voltage at node 124 will be only higher than the threshold voltage $V_D$, only Volt_D_Select signal output from converter 50*d*, respectively, will be high. Accordingly, when the DAE is operating at 1.8V, the output of voltage monitor 42*a* is "0001", corresponding to voltage select signals A, B, C, D.

Figure 5:
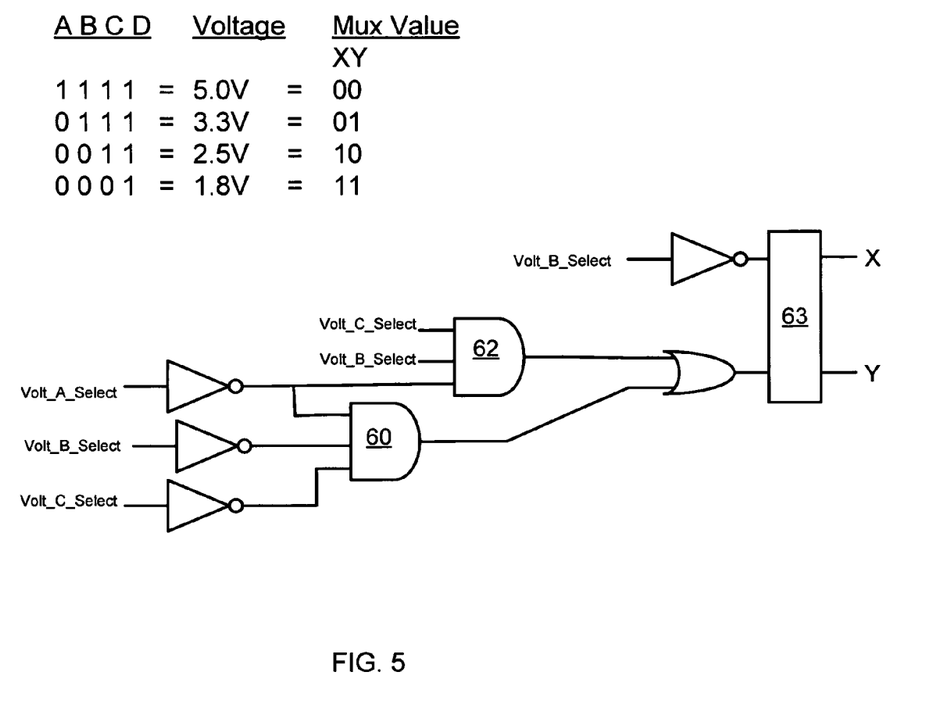
FIG. 5 is a schematic diagram of the logic portion of the diplexer of FIG. 3 in accordance with the present invention.

FIG. 5 is a schematic diagram showing the components and configuration of logic portion 44*a*. As shown in FIG. 5, each of Volt_A_Select, Volt_B_Select and Volt_C_Select signals are inverted before being input to an AND gate 60. The non-inverted Volt_B_Select and Volt_C_Select signals are input to an AND gate 62. The outputs of AND gates 60 and 62 are ORed to obtain the least significant bit Y of the mux control signal. The most significant bit X of the mux control signal is obtained by inverting the Volt_B_Select signal.

As shown in the chart of FIG. 5, when the output of voltage monitor 42*a* is "1111", corresponding to voltage select signals A, B, C, D, respectively, the output of logic portion 44*a* is "00", which causes mux 36*a* to pass the supply voltage $V_S$ of 5V to line 50*a*. When the output of voltage monitor 42*a* is "0111", corresponding to voltage select signals A, B, C, D, respectively, the output of logic portion 44*a* is "01", which causes mux 36*a* to pass the supply voltage $V_S$ of 3.3V to line 50*a*. When the output of voltage monitor 42*a* is "0011", corresponding to voltage select signals A, B, C, D, respectively, the output of logic portion 44*a* is "10", which causes mux 36*a* to pass the supply voltage $V_S$ of 2.5V to line 50*a*. Finally, when the output of voltage monitor 42*a* is "0001", corresponding to voltage select signals A, B, C, D, respectively, the output of logic portion 44*a* is "11", which causes mux 36*a* to pass the supply voltage $V_S$ of 1.8V to line 50*a*.

As a check on the X and Y signals output by the logic portion 44*a*, a debounce circuit 63 is implemented that insures that the correct voltage at node 124 was detected. In one embodiment, debounce circuit 63 includes a microprocessor having a clock running at 10 MHz which checks the status of the X and Y signals every ¹⁄₁₀ MHz time slice during a one second time frame. At the end of this one second time frame, the X and Y signals indicating the highest voltage detected by the voltage monitor 42*a* are output to the mux 36*a*. Alternatively, the debounce circuit my be implemented at the input of the logic device 44*a* to check the Volt_A_Select, Volt_B_Select, Volt_C_Select and Volt_D_Select signals output by the voltage monitor 42*a*.

Figure 6:
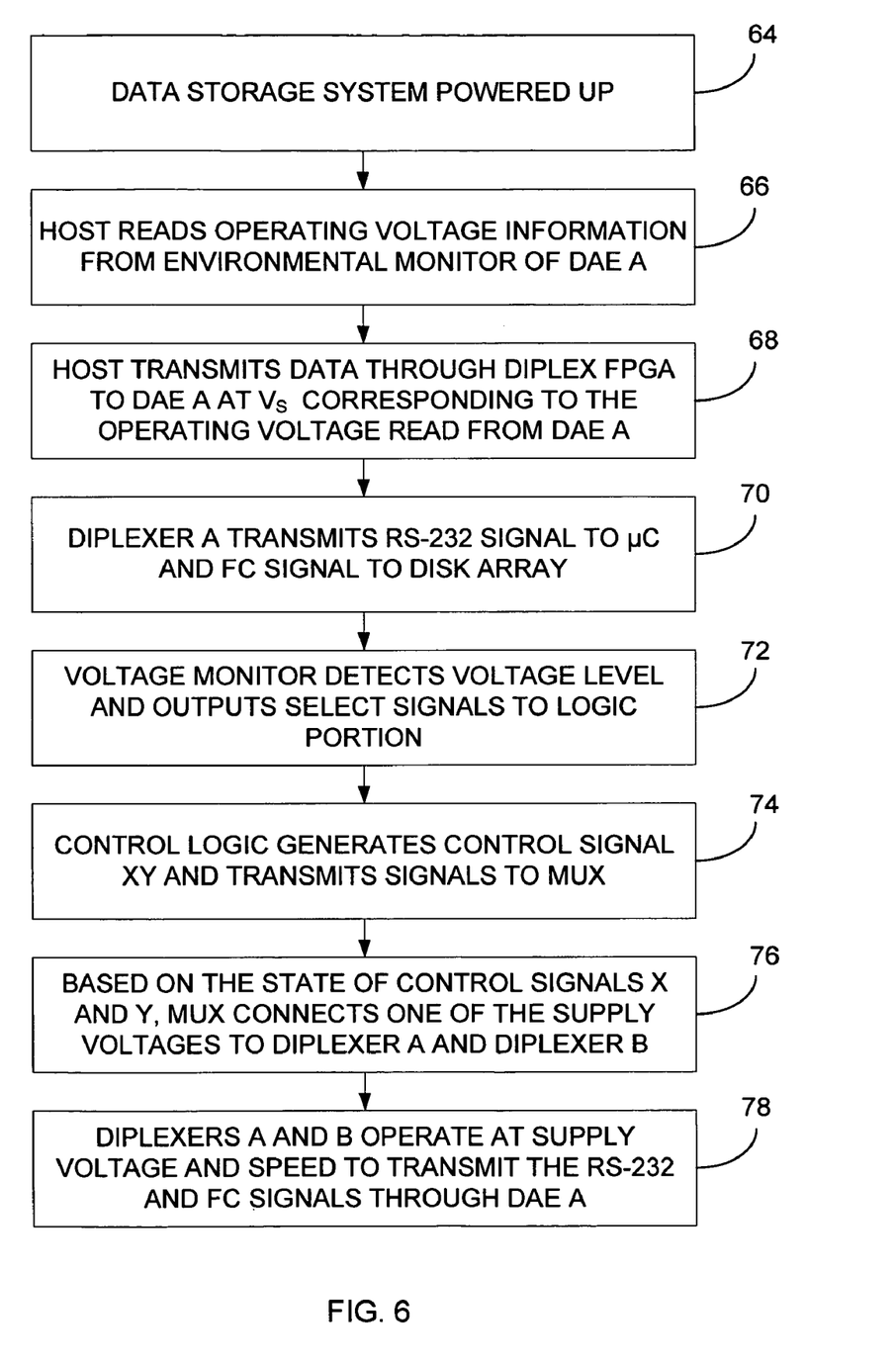
FIG. 6 is a flow diagram showing the steps involved in the speed autonegotiation process in accordance with the present invention.

The overall operation of the system will now be described with reference to FIGS. 6 and 7 which flow diagrams showing the steps involved in the operation of the system. At Step 64, the data storage system is powered up. For the purposes of this example, the system includes host 12, diplex FPGA and DAE A. DAE B is not yet coupled to DAE A. In Step 66, the host 12 reads the operating voltage information from the environmental monitor 48*a* of the DAE A. This information enables the host 12 to determine at which voltage and speed it will operate and communicate with the DAE A. In this example, the operating voltage information read from DAE A by the host 12 indicates that the DAE A is capable of operating at 3.3V, with a diplex speed of 19,200 baud and a FC speed of 2 GHz.

In Step 68, the host 12 transmits data to the DAE A through the diplex FPGA 10 at 3.3V. The diplexer 32*a* receives the data, transmits the RS-232 portion to the microcontroller 38*a* and transmits the FC portion to the disk drive array 34*a*, Step 70. The voltage monitor 42*a* receives the RS-232 portion, detects the voltage level of the signal, as described above, and outputs the corresponding voltage control signals to the logic portion 44*a*, Step 72. Since, in this example, the signal voltage at node 124 is approximately 3.3V, the output of voltage monitor 42*a* is "0111", corresponding to voltage select signals A, B, C, D, respectively. In Step 74, the logic portion 44*a* generates the control signal XY and transmits the control signal to the mux 36*a*. In this example, the control signal XY is "01". Based on the control signal XY transmitted to the mux 36*a* from logic portion 44*a*, the mux 36*a* connects one of the supply voltages to the line 50*a*, which provides the supply voltage $V_S$ to the diplexers 32*a* and 32*b*, Step 76. Since control signal XY is "01", the mux 36*a* connects its 3.3V input to line 50*a*. Diplexers 32*a* and 32*b* operate at the supply voltage, 3.3V in this instance, to transmit the RS-232 and FC signals through the DAE at 19,200 baud and 2 GHz, respectively, Step 78.

Figure 7:
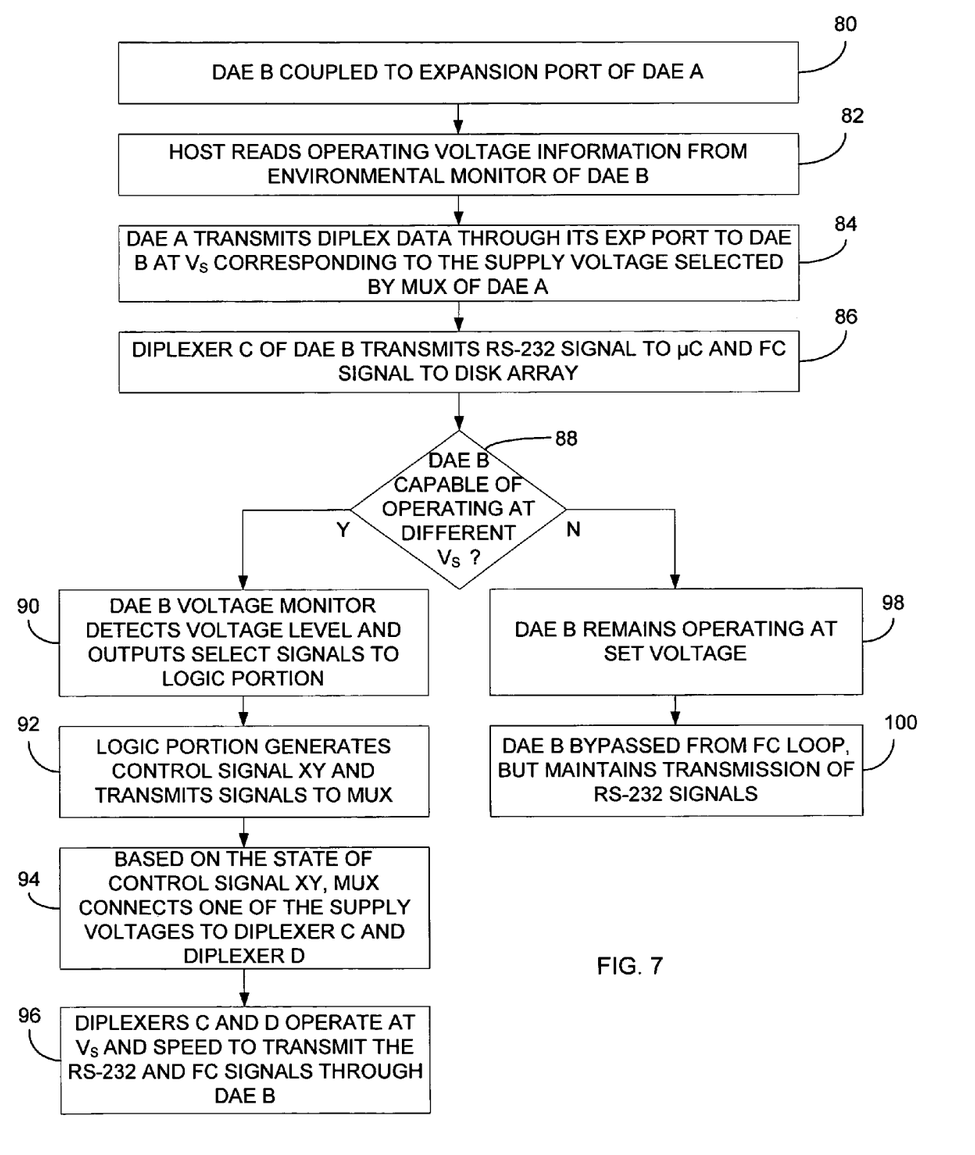
FIG. 7 is another flow diagram showing the steps involved in the speed autonegotiation process in accordance with the present invention.

FIG. 7 is a flow diagram showing the operation of the system when a downstream DAE B is coupled to the DAE A to expand the data storage system. In Step 80, the PRI port 30*b* of DAE B is coupled to the EXP port 40*a* of DAE A via twinax line 38, FIG. 2. The host 12 reads the operating voltage information from the environmental monitor of the microcontroller 38*b* of DAE B, Step 82. DAE A transmits diplex data through its EXP port 40*a* to DAE B at $V_S$ corresponding to the supply voltage selected by mux 36*a* of DAE A, Step 84. For the purposes of this example, $V_S$ is 3.3V. In Step 86, diplexer 32*c* transmits RS-232 signal to the microcontroller 38*b*. At this point, the operation of the system will depend on whether the DAE B is capable of operating at different voltages and speeds, Step 88. Based on the operating voltage information read from the DAE B by the host 12, the system enters one of two different modes of operation.

If the DAE B is capable of operating at different operating voltages, such as the DAE B shown in FIG. 2, the operation proceeds to Step 90, where the voltage monitor in microcontroller 38b of DAE B detects the level of the operating voltage and generates the voltage select signals as described above and outputs them to the logic portion. The logic portion of microcontroller 38b generates the control signal XY and transmits the control signal XY to the mux 36b, Step 92. Based on the state of the control signal XY, the mux 36b connects the supply voltage of 3.3V to the voltage supply line for diplexers 32c and 32d, Step 94. Since, in this example, DAE A is operating at 3.3V, DAE B will also operate at 3.3V. The voltage select signals and control signals generated within the DAE B will be the same as those generated in DAE A. Diplexers 32c and 32d then operate at the operating voltage of 3.3V to transmit the RS-232 and FC signals through the DAE B, Step 96.

If, in Step 88, the host 12, based on the operating voltage information read from the environmental monitor of the DAE B determines that the DAE B is, for example, a legacy DAE similar to the DAE 10 described in the '151 patent and therefore is not capable of operating at a voltage different than its set operating voltage of, most likely 5V, the DAE B remains operating at its set voltage, Step 98. However, while the DAE B will be capable of transmitting the RS-232 signals therethrough, the FC loop of the DAE B will be placed offline, Step 100, and therefore will not be available to the host 12.

Figure 8A:
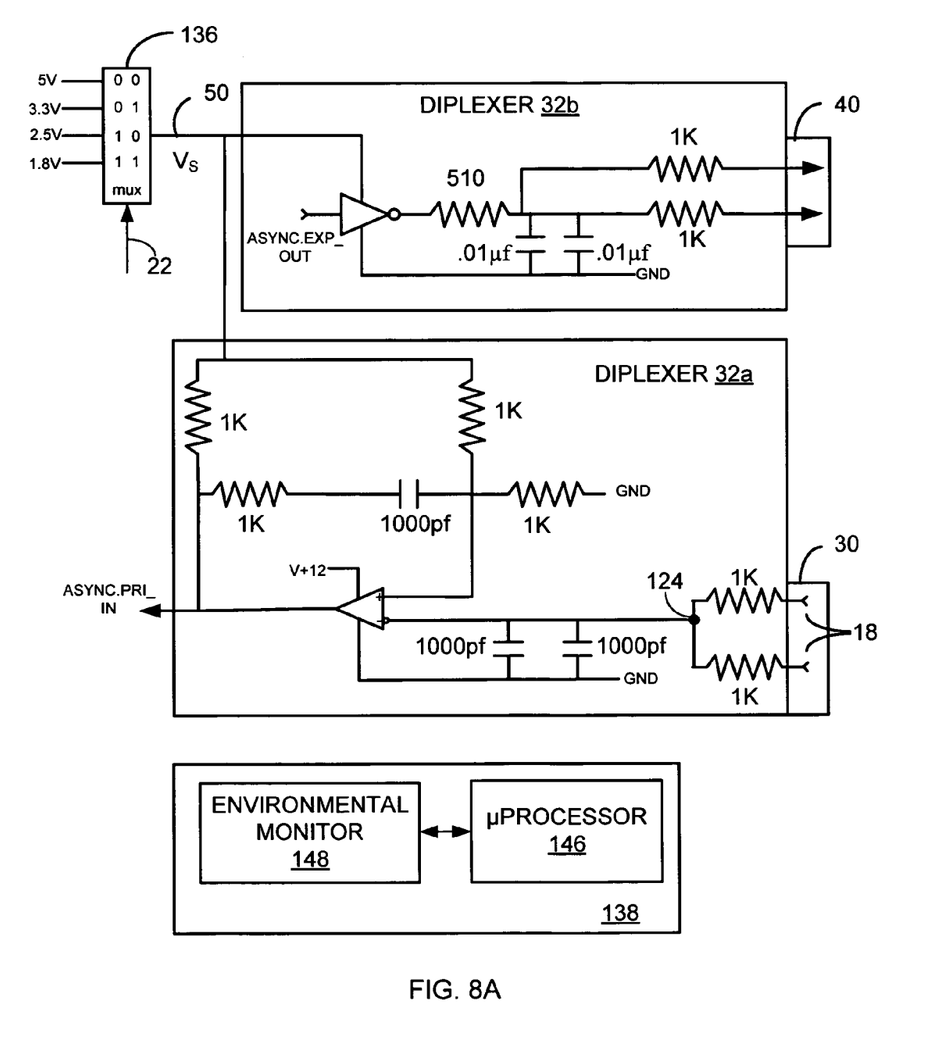
FIGS. 8A and 8B are schematic block diagrams of a another embodiment of a diplexer of the present invention.

Another embodiment of the invention is shown in FIG. 8A. As shown in FIG. 8A, microcontroller 138 includes a microprocessor 146 and environmental monitor 148. Rather than detecting the voltage received at node 124 by the voltage monitor 42a and generating control signals in logic portion 44a, FIG. 3, the embodiment of FIG. 8 utilizes software controls to monitor and control the operating voltage $V_S$ supplied to the diplexers 32a and 32b on line 50. Based on the information read from each DAE's environmental monitor 148 in Step 66, FIG. 6, the host sends a control signal on line 22, FIG. 1 and FIG. 8A, to the mux 136. The control signal on line 22 from the host causes the mux 136 to pass one of the supply voltages, 5V, 3.3V, 2.5V or 1.8V, to the voltage supply line 50, which causes the diplexers to operate at the supplied operating voltage $V_S$.

For example, if, on power up, the host reads data from the environmental monitor 148 that indicates that the first DAE is capable of operating at 3.3V or at 19,200 baud, the host will send a voltage control signal to the mux 136 over line 22 to instruct the mux to pass the 3.3V supply voltage to line 50. If a second DAE is coupled to the first DAE, as described above, and the host determines, from the information read from the environmental monitor, that the DAE is capable of operating at 2.5V or 38,400 baud, the host will instruct the mux to pass the 3.3V supply to line 50, as 3.3V is the voltage that the system was running at when the second DAE was attached. However, if both the first and second DAEs were determined to be capable of operating at 2.5V, on the next power up of the system, the host 12 would send control signals to the mux of each DAE to instruct the mux to pass the 2.5V supply. In a case where the second DAE is a legacy DAE and is only capable of operating at 5V, while the second DAE will be capable of transmitting the RS-232 signals therethrough at 5V, the FC loop of the second DAE will be placed offline and therefore will not be available to the host 12.

Figure 8B:
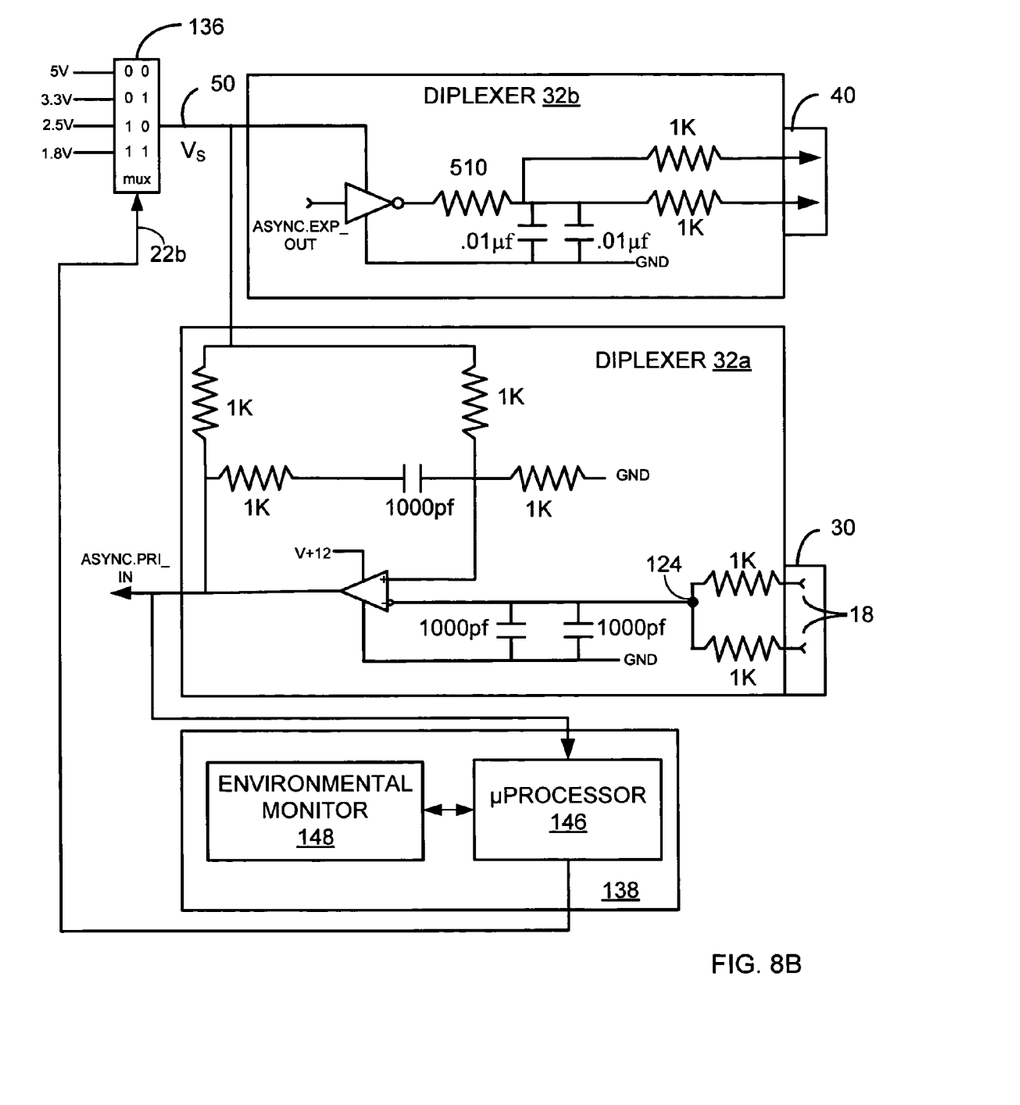

Alternatively, as shown in FIG. 8B, the microprocessor 146 receives a command from the host over the ASYNC.PRI_IN port and provides an input to the mux 136 via line 22b that instructs the mux to pass the supply voltage indicated by the host.

Figure 9:
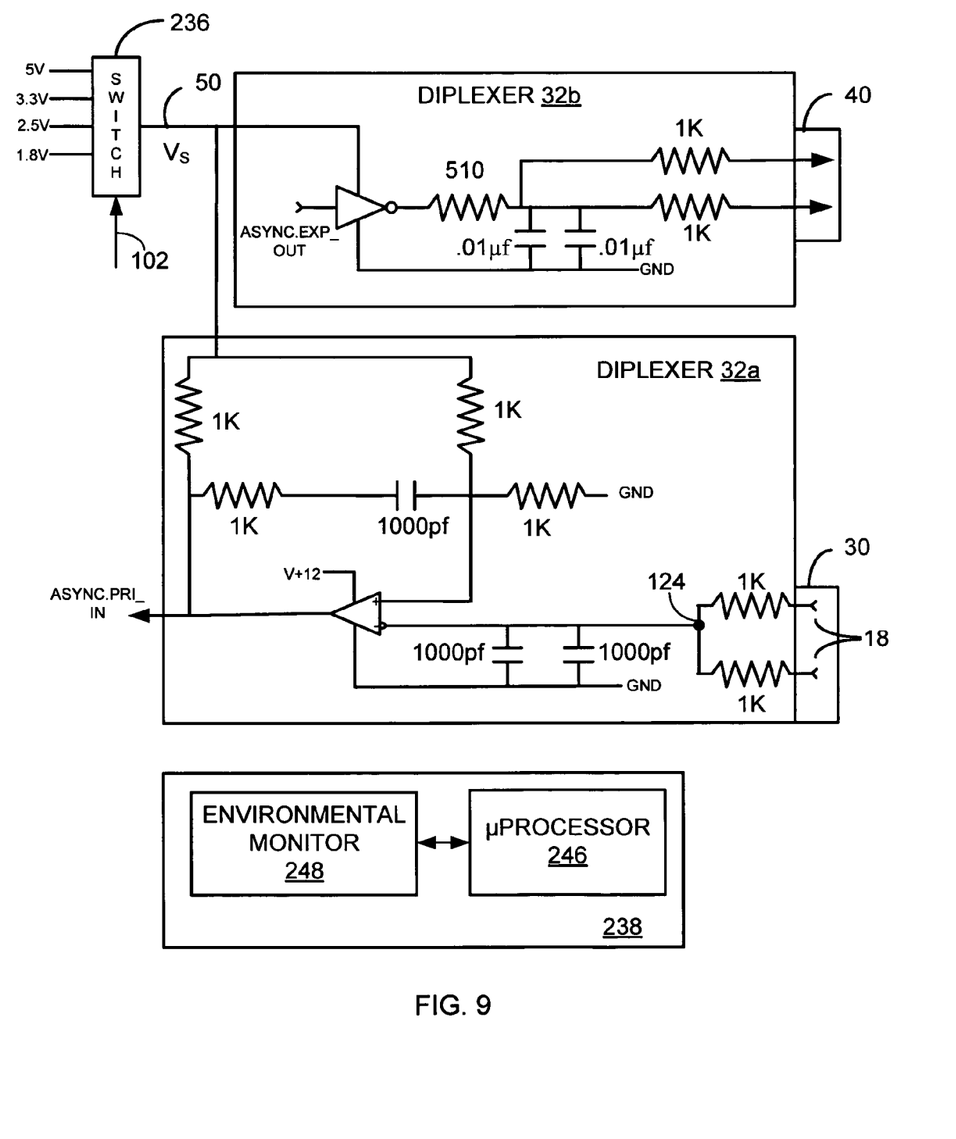
FIG. 9 is a schematic block diagram of a yet another embodiment of a diplexer of the present invention.

Another embodiment of the invention is shown in FIG. 9. As shown in FIG. 9, microcontroller 238 includes a microprocessor 246 and environmental monitor 248. Rather than detecting the voltage received at node 124 by the voltage monitor 42a and generating control signals in logic portion 44a, FIG. 3, the embodiment of FIG. 9 utilizes a manual switch to control the operating voltage $V_S$ supplied to the diplexers 32a and 32b on line 50. Based on the information read from each DAE's environmental monitor 148 in Step 66, FIG. 6, the host 12 provides an indication to a user of the system of the voltage and/or speed at which the DAEs are operating. This indication may be in the form of a visual display (not shown) or other form of a suitable indicator. When a user of the system desires to change the operating voltage of a DAE, the user utilizes a switch 236 which, via a user input 102, selects one of the supply voltages, 5V, 3.3V, 2.5V or 1.8V to pass to the line 50, which causes the diplexers to operate at the supplied operating voltage $V_S$.

Alternatively, the user input could be at the host which, upon receiving an input from a user to switch the operating voltage, sends a signal to the microprocessor 246, which then instructs the switch 236 to pass the supply voltage indicated by the host.

Accordingly, the invention provides a system which enables DAEs attached to a host in a loop to be switched between different operating voltages and speeds, in order to enable the system to operate at the fastest speed available for the loop of DAEs. The system enables DAEs that are capable of operating at different speeds to be utilized in a storage loop with so-called "legacy" DAEs that are only capable of operating a one speed, 5V, for example. In one embodiment, the DAE includes a voltage monitoring device which sets the operating voltage of the diplexers based on a detection of the voltage of a received signal. In another embodiment, the host, based on a reading from an environmental monitor of the DAE, sets the operating voltage using software commands. In yet another embodiment, the hosts informs a user of the system of the operating voltage of the DAEs of the system, and the user manually switches the operating voltage of the DAes between a number of available operating voltages.

As set forth above, the speed at which the diplexing portion operates is directly related to the voltage at which the diplex portion is operating. For example, a diplexer operating at 5V will transmit the RS-232 data at approximately 9,600 baud; a diplexer operating at 3.3V will transmit the RS-232 data at approximately 19,200 baud; a diplexer operating at 2.5V will transmit the RS-232 data at approximately 38,400 baud; and a diplexer operating at 1.8V will transmit the RS-232 data at approximately 76,800 baud. Likewise, as the speed at which the RS-232 data is transmitted increased, the fibre channel speed also increases. At 5V, the fibre channel data will be transmitted at approximately 1 Gb/s; at 3.3V, the fibre channel data will be transmitted at approximately 2 Gb/s; at 2.5V, the fibre channel data will be transmitted at approximately 4 Gb/s; and At 1.8V, the fibre channel data will be transmitted at approximately 8 Gb/s.

The system and method described herein may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory.

The system and method may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system and method also may be implemented as a machine-readable storage medium, configured with a computer program, where, upon execution, instructions in the computer program cause a machine to operate to perform the functions of the system and method described above.

Implementations of the system and method may be used in a variety of applications. Although the system and method is not limited in this respect, the system and method may be implemented with memory devices in microcontrollers, general-purpose microprocessors, digital signal processors (DSPs), reduced instruction-set computing (RISC), and complex instruction-set computing (CISC), among other electronic components.

Implementations of the system and method may also use integrated circuit blocks referred to as main memory, cache memory, or other types of memory that store electronic instructions to be executed by a microprocessor or store data that may be used in arithmetic operations.

The invention may be embodied in other specific forms without departing from the spirit or essential characteristics thereof. For example, the specific voltage levels or number of voltage levels referred to in the description are not pertinent of the invention. The DAEs may be capable of operating at different numbers of voltages and at different voltages levels than those described. Furthermore, the muxes 36 and 136 may also comprise a variable resistor or other device which, based on an input signal, is able to select one of a number of inputs to pass to an output thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A method for setting an operating voltage of a circuit, the method comprising:
   A. monitoring a voltage of a diplex signal input to the circuit;
   B. detecting a level of the input voltage as being one of a number X different voltage levels, where X is greater than 1, by comparing the input voltage to X reference voltages;
   C. generating a control signal corresponding to the voltage detected in Step B;
   D. inputting the control signal to an operating voltage selection device having the X different voltage levels input thereto;
   E. selecting, based on the control signal, an operating voltage from the X different voltage levels input to the operating voltage selection device; and
   F. inputting the voltage level selected in Step E to an operating voltage supply of the circuit.

2. The method of claim 1 wherein Step C includes converting the input voltage to a digital signal.

3. The method of claim 2 wherein the operating voltage selection device comprises a multiplexer that receives the control signal as an input and outputs one of the X voltage levels input thereto as the operating voltage based on the control signal.

* * * * *